United States Patent [19]

Ogasawara et al.

[11] Patent Number: 4,585,695
[45] Date of Patent: Apr. 29, 1986

[54] ELECTRICALLY CONDUCTIVE POLYPYRROLE ARTICLE

[75] Inventors: Makoto Ogasawara; Kazutoshi Funahashi, both of Tokyo, Japan

[73] Assignee: Agency of Industrial Science and Technology, Tokyo, Japan

[21] Appl. No.: 652,488

[22] Filed: Sep. 20, 1984

[30] Foreign Application Priority Data

Oct. 11, 1983 [JP] Japan ................. 58-188466
Oct. 21, 1983 [JP] Japan ................. 58-196062
Oct. 21, 1983 [JP] Japan ................. 58-196063

[51] Int. Cl.$^4$ .................. D02G 3/00; C25B 1/00
[52] U.S. Cl. .................. 428/364; 252/500; 428/910
[58] Field of Search .......... 428/364, 910, 411; 252/500, 518; 524/80, 401, 408, 412; 528/490, 491; 429/213, 111, 111 DS

[56] References Cited

U.S. PATENT DOCUMENTS

| | | | |
|---|---|---|---|
| 4,401,545 | 8/1983 | Naarmann et al. | 252/500 |
| 4,452,725 | 6/1984 | Wellinghoff et al. | 252/500 |
| 4,468,291 | 8/1984 | Naarmann et al. | 204/13 |
| 4,487,667 | 12/1984 | Traynor | 528/423 |
| 4,499,008 | 2/1985 | Wellinghoff et al. | 528/491 |

*Primary Examiner*—George F. Lesmes
*Assistant Examiner*—William M. Atkinson
*Attorney, Agent, or Firm*—Sherman and Shalloway

[57] ABSTRACT

An oriented electrically conductive polypyrrole article having a degree of orientation of at least 40% in at least one direction; an electrically conductive polypyrrole article having an electrical conductivity of at least 100 S/cm.; a process for producing an electrically conductive polypyrrole having improved electrical conductivity and stretchability, which comprises electrolytically polymerizing pyrrole and/or a pyrrole derivative in an electrolytic solution comprising an electrolyte and a solvent, said polymerization being carried out at a temperature of 0° to −50° C.; and a process for producing an electrically conductive polypyrrole article having improved electrical conductivity, which comprises stretching an electrically conductive polypyrrole article in at least one direction.

10 Claims, No Drawings

ELECTRICALLY CONDUCTIVE POLYPYRROLE ARTICLE

BACKGROUND OF THE INVENTION

1. Field of the Invention

This invention relates to an oriented electrically conductive polypyrrole article and a process for production thereof.

2. Description of the Prior Art

Organic polymeric compounds are generally classified as insulators. It has been found however that by adding certain kinds of compounds, they become electrically conductive and can be used as semiconductors or conductors. It has been found that these electrically conductive polymers become p- or n-type semiconductors or conductors depending upon the kind of the additives, and can find applications in electronic materials and electrical cells or batteries. In general, such organic polymeric compounds as polyacetylene, polyphenylene sulfide and poly-p-phenylene are unstable, and this disadvantage limits their practical applications.

Polypyrrole is a noteworthy electrically conductive polymer because of its relatively high electrical conductivity and high stability in air. It is known that polypyrrole is obtained as an insoluble, infusible film-like polymer by an electrolytic oxidizing method (A. F. Diaz and K. K. Kanazawa, J. C. S. Chem. Comm., 1979, 635) in which platinum or gold is used as an anode and the film-like polymer is deposited on the anode surface. The polypyrrole film so obtained does not have sufficiently high electric conductivity.

SUMMARY OF THE INVENTION

The present inventors made extensive investigations on a method of increasing the electrical conductivity of an electrically conductive shaped article of polypyrrole, such as an electrically conductive film, and have now found that an electrically conductive polypyrrole article which is oriented highly in at least one direction has very high electric conductivity and much improved mechanical properties such as increased strength and modulus.

It is an object of this invention to provide a highly electrically conductive polypyrrole article, and an electrically conductive article (especially film) of polypyrrole having a high degree of orientation and good mechanical properties.

The object of this invention is achieved by stretching a non-oriented or lowly oriented electrically conductive polypyrrole article in at least one direction to convert it to an electrically conductive polypyrrole article having a high degree of orientation.

DETAILED DESCRIPTION OF THE INVENTION

The term "electrically conductive polypyrrole article", as used herein, denotes an article in various forms, such as a thread, rod or film, of polypyrrole which is itself doped and develops corresponding electrical conductivity.

The term "polypyrrole", as used herein, denotes a homopolymer or copolymer of pyrrole or its derivative, particularly its N-alkyl derivative. A homopolymer of pyrrole is preferred.

The dopant which develops electrical conductivity in cooperation with polypyrrole is a compound which is electron-accepting with respect to polypyrrole. Specific examples of the dopant are halogen anions such as $Cl^-$, $Br^-$ and $I^-$; peracid anions such as $ClO_4^-$; anions of protonic acids such as a sulfate anion, a nitrate anion or a phosphate anion; anions from Lewis acids such as $BF_4^-$, $PF_6^-$, $AsF_6^-$ and $SbF_6^-$; anions from organic carboxylic acids such as $HCOO^-$; $CH_3COO^-$; $HOOC.COO^-$, $CH_2Cl.COO^-$, $CHCl_2COO^-$, $CCl_3COO^-$ and $CF_3COO^-$; and anions from organic sulfonic acids such as $CCl_3SO_3^-$, $CF_3SO_3^-$, $CH_3SO_3^-$ and

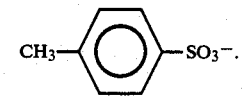

The "doping", as used herein, denotes the phenomenon in which the aforesaid dopant, in cooperation with polypyrrole, develops higher electrical conductivity when it is incorporated in polypyrrole; and does not particularly limit the relation between polypyrrole and the dopant. In most cases, polypyrrole and the dopant form a chemical bond in the form of a charge transfer complex, etc., but in another case, they may be merely in the form of a mixture.

It may be said that the electrically conductive polypyrrole formed of polypyrrole and the dopant is substantially non-oriented immediately after formation. Even in the non-oriented state, it shows electrical conductivity.

According to this invention, an electrically conductive polypyrrole article having a much increased electrical conductivity (for example, 1000 S/cm) can be produced by highly orienting a non-oriented or lowly oriented polypyrrole article in at least one direction to a degree of orientation of at least 40%, preferably at least 60%. The highly oriented polypyrrole film of this invention shows an X-ray diffraction pattern. The simplest method of obtaining the electrically conductive polypyrrole article having a high degree of orientation is to stretch an electrically conductive polypyrrole article which is non-oriented or has a low degree of orientation.

The stretching is carried out while the polypyrrole contains the dopant and forms an article, namely while it is in the form of an electrically conductive article.

The stretching can be carried out in a dry atmosphere, for example in air or nitrogen gas. It may be carried out in the presence of a solvent which does not adversely affect the dopant in the polypyrrole, for example in a vapor of water, an aqueous solvent or an organic solvent, or in a wet condition provided by such a solvent in liquid form. It should be understood that the term "solvent", as used herein, does not means dissolving of polypyrrole.

Suitable substances which form the wet condition are liquid substances which have a boiling point of, for example, 0° to 250° C., preferably 10° to 200° C., and do not adversely affect the electric conductivity of the electrically conductive polypyrrole. Its electrical conductivity may be adversely affected when such a liquid substance acts on the dopant, for example chemically reacts with the dopant to destroy the inherent function of the dopant (for example, solvents having high basicity such as aliphatic amines or alkali solutions), or when such a compound acts on polypyrrole, for example when it is chemically bonded to polypyrrole, or chemically decomposes it, to destroy the inherent function of polypyrrole (such as concentrated sulfuric acid and concentrated nitric acid).

Specific examples of the substances which forms the vapor or the wet condition include the following.

(i) Hydrocarbons such as n-hexane, cyclohexane, heptane, benzene, toluene and xylene.

(ii) Chlorinated hydrocarbons such as dichloromethane, 1,1,1-trichloroethane and chlorobenzene.

(iii) Nitriles such as acetonitrile, propionitrile and benzonitrile.

(iv) Ketones such as acetone, methyl ethyl ketone, methyl isobutyl ketone and cyclohexanone.

(v) Ethers such as anisole, tetrahydrofuran, dioxane, butyl ether and butyl Cellosolve.

(vi) Nitro compounds such as nitromethane and nitrobenzene.

(vii) Esters such as ethyl acetate, n-butyl acetate, propylene carbonate and propiolactone.

(viii) Alcohols such as methanol, ethanol, butanol and ethylene glycol.

(ix) Organic acids such as acetic acid and propionic acid.

(x) Aromatic amines having low basicity such as pyridine and aniline.

(xi) Aprotic polar organic compounds such as N,N-dimethylformamide, dimethyl sulfoxide and sulfolane.

(xii) Water and aqueous solvents containing neutral salts or alcohols.

These compounds can be used either singly or as mixtures.

The compounds of groups (i) to (ix) and (xi) are preferred.

The electrically conductive polypyrrole article can be most conveniently stretched in a vapor of such a substance or in a wet condition brought about by this substance by immersing the polypyrrole article in the substance in liquid form and stretching it in this state. Or it is possible to impregnate the electrically conductive polypyrrole article fully with such a substance and stretch the impregnated article. Alternatively, the electrically conductive polypyrrole article may be stretched while it is exposed to a vapor of the substance.

The temperature at which the stretching is carried out in a dry atmosphere of air, nitrogen gas, etc. or in a vapor of the solvent or in a wet condition provided by the solvent varies depending upon the kind of the dopant or whether the stretching atmosphere is dry or wet, or also upon the kind of the wet substance in the wet atmosphere. Usually, it is 0° to 300° C., preferably 10° and 200° C., especially preferably 20° to 150° C.

The stretch ratio is preferably as high as possible. In the case of stretching in a dry atmosphere of air or nitrogen, it is usually 30 to 100%, preferably 50 to 90%. In a vapor of the solvent or in a wet condition provided by the solvent, the stretch ratio is usually at least 50%, preferably at least 60%, more preferably at least 80%. From the viewpoint of stability in the manufacturing process, the stretch ratio is not more than 300%, preferably not more than 200%, especially preferably not more than 150%.

The stretching rate is 0.5%/sec to 1000%/sec., preferably 5%/sec to 100%/sec.

According to one embodiment of the method of stretching, the film is held at both ends and stretched under tension.

Another example of the method of stretching is to stretch the film under pressure between rotating rollers. At this time, the peripheral speed of the rollers is 0.1 mm/min. to 1000 mm/min., preferably 0.5 mm/min. to 100 mm/min., especially preferably 1 mm/min. to 10 mm/min. The temperature and atmosphere conditions are the same as described above. The pressure between the rollers is 10 to 1000 kg/cm, preferably 50 to 500 kg/cm.

Still another example of the method of stretching is to stretch the film under pressure between flat surfaces. The pressure applied in this case is 10 to 1000 kg/cm$^2$, preferably 50 to 500 kg/cm$^2$.

As required, the electrically conductive polypyrrole article stretched under the foregoing conditions is then heat-set at a temperature of at least 50° C., preferably 80° to 300° C., more preferably 100° to 250° C., for 1 minute to 1 hour, preferably 5 minutes to 0.5 hour. Heat-setting may be carried out under no tension, but preferably under tension.

The foregoing procedure gives an electrically conductive polypyrrole article having a degree of orientation, as defined below, of at least 40%, preferably at least 60%, more preferably at least 70%. Thus, an article being in the non- or low-oriented state and having a low electrical conductivity of, for example, 50 S/cm is converted by orientation into an article having an electrical conductivity of at least 100 S/cm, preferably at least 200 S/cm. An article being in the non- or low-oriented state and having a relatively high electrical conductivity of, for example, 100 to 300 S/cm, is converted by orientation into an article having an electrical conductivity of at least 300 S/cm, preferably at least 500 S/cm, and even as high as more than 1000 S/cm.

$$f \text{(degree of orientation)} = \frac{180 - H°}{180} \times 100 \, (\%)$$

wherein H° is the full width of the half maximum intensity of the X-ray intensity curve along the Debye-Schenner ring of the orientation peak.

The polypyrrole, as defined hereinabove, for use in obtaining the highly oriented electrically conductive polypyrrole article of this invention can be synthesized by known methods. For example, pyrrole and/or its derivative is reacted under the conditions described in A. F. Diaz and K. K. Kanazawa, J. C. S. Chem. Comm. 1979, 635 and K. K. Kanazawa et al., Synthetic Metals, 1 (1979/80), 329-336 in an electrolytic solution containing an electrolyte, a solvent and as required, a small amount of water using a platinum plate as a working electrode and a platinum plate or a known general-purpose material as a counter electrode.

Preferably, the starting pyrrole and its derivative used in the above reaction have a high purity. Desirably, prior to use, these materials are purified by distillation.

The pyrrole derivatives include, for example, $C_{1-5}$ N-alkyl derivatives, N-phenyl derivatives, derivatives obtained by substituting a $C_{1-5}$ alkyl or alkoxy group at the beta-position of the pyrrole ring, and substitution products of the phenyl derivatives. These pyrrole derivatives can be polymerized in the same way as above.

The electrolyte used in the above reaction is preferably one which causes the electrolytic oxidation reaction to proceed, thereby precipitating homogeneous polypyrrole having a high electrical conductivity on the anode surface. It may, for example, be quaternary ammonium salts and alkali metal salts having the aforesaid dopants as anions.

Specific examples of the electrolytes include tetraethyl ammonium bromide, tetraethyl ammonium iodide, tetraethyl ammonium perchlorate, tetraethyl ammonium tetrafluoroborate, tetraethyl ammonium p-toluenesulfonate, tetra-n-butyl ammonium bromide, tetra-n-butyl ammonium iodide, tetra-n-butyl ammonium perchlorate, tetra-n-butyl ammonium tetrafluoroborate, tetra-n-butyl ammonium p-toluenesulfonate, tetra-n-butyl ammonium hydrogen sulfate, lithium perchlorate, lithium nitrate, lithium tetrafluoroborate, sodium perchlorate and tetra-n-butyl ammonium acetate.

The electrolyte should be in such an amount that it dissolves as a solution and gives a current required for the proceeding of the reaction. Its minimum amount is 0.1 mole, preferably 0.3 mole, per mole of pyrrole, and its maximum amount is that in which it is saturated in the electrolytic solution. The presence of the electrolyte in an amount exceeding the saturated amount is not deleterious, however. The concentration of the electrolyte in the electrolytic solution normally used varies depending upon the kinds of the solvent and the electrolyte and the amount of water optionally used. Usually, it is 0.001 to 2 moles/liter, preferably 0.05 to 0.5 mole/liter.

The solvent used for the reaction should be stable at a voltage required for the polymerization of the pyrrole compound and have a high dissolving power for the electrolyte and water. Examples of such a solvent are acetonitrile, benzonitrile, hexahydrofuran, nitrobenzene, propylene carbonate and hexamethyl phosphoramide. These are only illustrative examples, and conventional solvents generally known in electrolytic reactions may be used if they meet the aforesaid conditions.

Water optionally used serves to increase the effect of the electrolyte and betters the form in which polypyrrole is deposited. The amount of water varies depending upon the kind of the electrolyte used. The concentration of water in the electrolyte solution is 0.1 to 4 moles/liter, preferably 0.3 to 3 moles/liter.

Any cathode materials which are generally used in the electrode reaction and do not break nor deteriorate the resulting polypyrrole film can be used. Electrically conductive materials such as metals (e.g., platinum, gold, copper and nickel), $SnO_2$, $In_2O_3$ and the like, and carbon may be used. When the electrode area of the cathode is larger than that of the anode, the condition of deposition of polypyrrole is generally good. The ratio of the area of the cathode to that of the anode is at least 1.1, preferably at least 1.5, more preferably at least 2, especially preferably at least 3.

The electrolytic voltage and the electrolytic current vary depending upon the reaction conditions. Generally, the electrolytic voltage is at least 1.0 V, preferably at least 1.5 V, especially preferably at least 2 V. In view of the stability of the solvent used in the electrolytic reaction, the electrolytic voltage is desirably not more than 3.0 V. The electrolytic current, as the current density at the anode, is 0.001 to 5 mA/cm$^2$, preferably 0.01 to 3 mA/cm$^2$, especially preferably 0.5 to 1 mA/cm$^2$.

Preferably, the entire reaction device is adapted to be temperature-controlled.

There is no particular limitation on the reaction temperature. Usually, it is not more than 100° C., preferably not more than 50° C., especially preferably −50° C. to 0° C.

In particular, polypyrrole articles obtained by the reaction at low temperatures can be stretched at high stretch ratios. When the polypyrrole article is obtained by the above electrolytic reaction, a part of the anion dissociated from the electrolyte is taken into the polypyrrole article and acts itself as a dopant, and thus gives an electrically conductive polypyrrole article.

The polypyrrole article (film) used in this invention may also be obtained by a method similar to the method of K. K. Kanawawa et al. (JPS. Poly. Lett. Edd. 1982, 187) which comprises pouring a solution consisting of 2 ml of pyrrole and 10 ml of ethanol into 1.9N-sulfuric acid in a petri dish with stirring, and allowing the solution to stand for 15 hours to form polypyrrole as a film on the surface. In this case, the polypyrrole contains a sulfate ion as a dopant and thus can directly be an electrically conductive polypyrrole article.

The resulting electrically conductive polypyrrole article may be directly subjected to the aforesaid stretching treatment. But as desired, the dopant included during the reaction may be replaced by the desired dopant.

When a halogen atom is desired as the dopant, it is possible to substitute it for the dopant in the polypyrrole article and then subject it to the stretching treatment. Substitution of the dopant may be carried out by electrochemically removing the dopant from the polypyrrole (i.e., by the electrolytic reduction of polypyrrole) and thereafter, adding the desired dopant by an electrochemical method, a vapor method or a liquid phase method.

The resulting non-oriented or lowly oriented electrically conductive polypyrrole article may be stretched as described above to obtain the article contemplated in this invention.

The following Examples illustrate the present invention in greater details.

In these examples, the electrical conductivity was determined by first measuring the voltage by a four-terminal method using a digital voltmeter (Model 3456A made by Hewlett Packard Co.) and calculating the electrical conductivity from the measured voltage.

The degree of orientation (f) is calculated from the equation given hereinabove. Unless otherwise specified, it is a value at $2\theta = 25.7°$.

X-ray diffraction was carried out as follows: X-rays of a sample having a thickness of about 500 micrometers obtained by using $CuK_\alpha$ radiation as a source by an X-ray diffraction device (No. 4053A3, made by Rigaku Denki) were measured by a scintillation counter in a customary manner.

According to such an X-ray diffraction, the differences of diffraction patterns as shown in the following table generally arise between an unstretched sample and an oriented sample.

|  | Diffraction pattern of the unstretched sample ($2\theta$, degree) | Diffraction pattern of the oriented sample ($2\theta$, degree) |
| --- | --- | --- |
| Equatorial direction | 19.3–27.5<br>4.6–8.5 | 24.0–27.2<br>18.3–23.7<br>4.0–8.5 |
| Meridian direction | 19.3–27.5<br>4.6–8.5 | 18.3–25.6<br>13.0–14.4<br>4.0–8.5 |

It is seen from the above table that with the unstretched sample, there is no difference in pattern between the equatorial direction and the meridian direction, but with the oriented sample, orientation peaks were observed at $2\theta=24.0°-27.2°$ and $4.0°-8.5°$ in the equatorial direction, and at $2\theta=13.0°-14.4°$ in the meridian direction.

EXAMPLE 1

(1) In a 300 ml separable glass electrolytic cell equipped with two electrode introducing openings, a nitrogen introducing pipe and a gas discharge opening, a platinum plate, 5 cm long and 4 cm wide, was set as an anode and a copper foil, 5 cm wide and 40 cm long, was set as a counterelectrode.

The entire electrolytic cell was immersed in a cooled bath so as to adapt it for temperature control.

Then, 200 ml of a propylene carbonate solution containing 0.06 mole/liter of pyrrole and 0.1 mole/liter of tetraethyl ammonium perchlorate an 2 ml of water were put in an electrolytic cell. While nitrogen was introduced in the form of bubbles into the solution, the reaction was carried out at $-20°$ C. and 3.2 mA (current density=0.08 mA/cm$^2$) for 36 hours.

(2) Then, the anode on which polypyrrole was deposited was transferred to a propylene carbonate solution (to be referred to as a holding solution hereinafter) cooled at $-20°$ C. and containing 0.1 mole/liter of tetraethyl ammonium perchlorate. The temperature of the solution was returned to room temperature, and the resulting film was peeled from the electrode. The film had a thickness of 23 micrometers and an electrical conductivity of 295 S/cm.

(3) The film was immersed for 1 day in 50 ml of acetonitrile, withdrawn, and dried at 40° C. for 15 hours. The film was then slit in a rectangular piece having a width of 5 mm. It was held by chucks with a chuck-to-chuck distance of 20 mm, and stretched 90% at a rate of 2%/sec at room temperature in air.

The stretched film was heat-set for 5 minutes in a hot air dryer at 150° C.

The film had an electrical conductivity in the stretching direction of 896 S/cm. In the X-ray diffraction pattern of this film, orientation peaks appeared, and it had a degree of orientation of 72.3%. In the X-ray diffraction pattern of the film, orientation peaks appeared at $2\theta=5.1°-8.5°$ and $24.0°-26.6°$ in the equatorial direction, and $2\theta=13.0°-14.0°$ in the meridian direction.

EXAMPLE 2

The same reaction at $-20°$ C. as in Example 1, (1) and (2) was carried out using tetraethyl ammonium p-toluenesulfonate as the electrolyte and acetonitrile as the solvent. The resulting film was withdrawn in the acetonitrile solvent. The film had an electric conductivity of 130 S/cm.

The film was stretched 40% in the same way as in Example 1. The stretched film had an electrical conductivity in the orienting direction of 320 S/cm, and a degree of orientation of 71.2%.

EXAMPLES 3 TO 5

In each run, a polypyrrole film was prepared by the same device and operations as in Example 1, (1) and (2). The film was immersed in each of the solvents indicated in Table 1 below at room temperature for 3 days, and stretched there in 120% at a stretching rate of 2%/sec.

The electrical conductivities in the stretching direction and the degrees of orientation of the stretched polypyrrole films were as shown in Table 1.

TABLE 1

| Example | Solvent | Electrical conductivity (S/cm) | Degree of orientation (%) |
|---|---|---|---|
| 3 | CH$_3$CN | 930 | 74.3 |
| 4 | Butyl Cellosolve | 866 | 73.3 |
| 5 | Acetic acid | 919 | 73.1 |

EXAMPLES 6 TO 19

In each run, a polypyrrole film was prepared by the same device and operations as in Example 1, (1) and (2). The film was immersed in each of the solvents indicated in Table 2 below for 3 days at room temperature. Then, in this solvent, the film was stretched 100% at a stretching temperature of 40° C. and a stretching rate of 2%/sec. The electrical conductivity of the stretched film in the stretching direction was measured. The results are shown in Table 2. The films obtained in these examples had a degree of orientation of more than 60%.

TABLE 2

| Example | Solvent | Electrical conductivity (S/cm) |
|---|---|---|
| 6 | Propylene carbonate | 860 |
| 7 | Acetonitrile | 891 |
| 8 | 1,1,1-Trichloroethane | 725 |
| 9 | Butyl Cellosolve | 784 |
| 10 | N,N—dimethylformamide | 805 |
| 11 | Methyl isobutyl ketone | 705 |
| 12 | n-Hexane | 851 |
| 13 | n-Butyl acetate | 736 |
| 14 | Acetic acid | 835 |
| 15 | Methanol | 830 |
| 16 | Nitrobenzene | 790 |
| 17 | Anisole | 850 |
| 18 | Aniline | 320 |
| 19 | Water | 360 |

EXAMPLE 20

The same synthesizing reaction as in Example 1, (1) was carried out except that the reaction time was changed to 20 hours. The resulting electrically conductive polypyrrole film was subjected to a dopant eliminating treatment in an electrolytic cell containing a propylene carbonate solution containing 0.03 mole/liter of tetraethyl ammonium bromide at 2 V for 20 hours by reversing the wiring of the electrodes set during film formation. When the treated film was analyzed by fluorescent X-rays, only a trace of chlorine originating from the perchlorate was detected. The electrical conductivity of the treated film was less than $10^{-5}$ S/cm. In an electrolytic cell containing a fresh propylene carbonate solution containing 0.03 mole/liter of tetraethyl ammonium bromide, the wiring of the electrodes was again set as during film formation, and by applying a potential of 3 V, the reaction was carried out for 20 hours. The resulting electrically conductive polypyrrole film had a thickness of 35 micrometers and an electrical conductivity of 28 S/cm.

The film was stretched 100% at 40° C., and heat-set, in the same way as in Example 1. The stretched film had an electrical conductivity of 1080 S/cm in the stretching direction, and a degree of orientation of 74.2%.

EXAMPLE 21

An electrically conductive polypyrrole film was obtained by the same reaction as in Example 1, (1) and (2). The film was immersed in acetonitrile for 24 hours, and then dried at 40° C. for 12 hours. The dried electrically conductive polypyrrole film was exposed to a vapor phase of each of the boiling solvents indicated in Table 3, and stretched 100%. All of the films had a degree of orientation of more than 70%. The electrical conductivities of the films were as shown in Table 3.

TABLE 3

| Solvent | Electrical conductivity (S/cm) |
| --- | --- |
| Dichloromethane | 805 |
| n-Hexane | 805 |
| Acetonitrile | 960 |

EXAMPLE 22

A polypyrrole film was obtained in the same way as in Example 1, (1) and (2) except that the current was changed to 3 mA and the reaction time was changed to 26 hours. The resulting film had a thickness of 28 micrometers and an electrical conductivity of 305 S/cm. The film was slit in a rectangular piece having a width of 5 mm, held by chucks with a chuck-to-chuck distance of 20 mm, immersed in propylene carbonate heated at 40° C. for 1 minute to preheat it, and stretched 120% at a rate of 4%/sec. The stretched film was then heat-set for 5 minutes in a hot air dryer at 150° C.

The resulting film had an electrical conductivity in the stretching direction of 1005 S/cm, and an elongation at break of 130%.

EXAMPLES 23 TO 26

Films were prepared by the same device and operations as in Example 22 but at the various reaction temperatures indicated in Table 4. The electrical conductivities of the unstretched films and the stretched films were as shown in Table 4.

TABLE 4

| | | Electrical conductivity (S/cm) | |
| --- | --- | --- | --- |
| Example | Reaction temperature (°C.) | Unstretched film | 70% Stretched film |
| 23 | −30 | 320 | 810 |
| 24 | −10 | 275 | 665 |
| 25 | −5 | 234 | 643 |
| 26 | 0 | 197 | 578 |

EXAMPLES 27 TO 30

The same device as in Example 1 was used except that it was adapted for temperature control between 10° and 50° C. In each run, a film was prepared in the same way as in Example 22 except that the reaction temperature was changed as shown in Table 5. The electrical conductivities of the unstretched films and the 30% stretched films were as shown in Table 5.

TABLE 5

| | | Electrical conductivity (S/cm) | |
| --- | --- | --- | --- |
| Example | Reaction temperature (°C.) | Unstretched film | 30% Stretched film |
| 27 | 10 | 132 | 240 |
| 28 | 20 | 96 | 169 |
| 29 | 30 | 86 | — |
| 30 | 50 | 75 | — |

When the unstretched film obtained in Example 28 was stretched 30% as in Example 22, the stretched film had an elongation at break of 35%.

EXAMPLE 31

A polypyrrole film was prepared in the same way as in Example 1, (1) and (2) except that the electrolyzing time was changed to 60 hours. The resulting film had a thickness of 100 microns and an electrical conductivity of 280 S/cm.

The film was slit in a rectangular piece having a width of 5 mm, held by chucks with a chuck-to-chuck distance of 20 mm, immersed for 1 minute in the holding solution heated at 70° C. to pre-heat it, and then stretched 90% at a rate of 50%/sec.

The film was transferred to a hot air dryer at 150° C., and heat-set for 5 minutes.

The stretched film had an electrical conductivity in the stretching direction of 1050 S/cm. In the X-ray diffraction pattern of this film, orientation peaks appeared. The film had a degree of orientation of 75.4%.

EXAMPLE 32

The same reaction at −20° C. as in Example 31 was carried out except that tetraethyl ammonium p-toluenesulfonate was used as the electrolyte and acetonitrile was used as the solvent. The resulting product was withdrawn in acetonitrile solvent, and a film having an electrical conductivity of 130 S/cm was obtained.

When the film was stretched 40% in the same way as in Example 31, the film had an electrical conductivity in the stretching direction of 320 S/cm and a degree of orientation of 71.2%.

EXAMPLE 33

An electrically conductive polypyrrole film was obtained by the same reaction as in Example 31. This film was immersed for 24 hours in acetonitrile, and then dried at 40° C. for 12 hours. The dried electrically conductive polypyrrole film was exposed to a vapor of each of the boiling solvents indicated in Table 6, and stretched 100%. The electrical conductivities of the resulting film were as shown in Table 6.

TABLE 6

| Solvent | Electrical conductivity (S/cm) |
| --- | --- |
| Dichloromethane | 805 |
| n-Hexane | 805 |
| Acetonitrile | 960 |

EXAMPLE 34

(1) The same reaction as in Example 1, (1) was carried out except that the reaction was carried out at room temperature without cooling the electrolyte, the electric current was changed to 40 mA (current density=1 mA/cm$^2$), and the reaction time was changed to 3 hours. After the reaction, the anode was taken out and washed with propylene carbonate and acetone, and a black polypyrrole film was peeled from the platinum plate.

The film had a thickness of 35 micrometers and an electrical conductivity of 85.6 S/cm.

(2) The film was slit in a rectangular piece having a width of 5 mm, held by chucks with a chuck-to-chuck distance of 20 mm, stretched 30% at a rate of 100%/min., and heat-set at 150° C. for 5 minutes. The resulting film had an electrical conductivity of 154.9 S/cm. The X-ray diffraction pattern (transmission direction) of the film shows an orientation pattern seen at $2\theta=0.40-0.48$ in a direction (equatorial direction) at right angles to the stretching direction. The film had a degree of orientation of 58.8% at $2\theta=25.7°$. The photograph was taken by a Cu tube (made by Phillips Company) at a camera distance of 5 cm using a strong X-ray diffraction device DF3 made by Rigaku Denki Co., Ltd.

EXAMPLE 35

When the same reaction as in Example 34 was carried out for 3 hours at a current density of 0.35 mA/cm$^2$, a film having a thickness of about 12 micrometers was obtained. This film had an electrical conductivity of 146.3 S/cm. The film was slit in a rectangular piece having a width of 5 mm, held by chucks with a chuck-to-chuck distance of 20 mm, stretched 30% at a rate of 2%/min., and heat-set at 150° C. for 5 minutes. The stretched film was found to have an electrical conductivity of 271.0 S/cm and a degree of orientation at $2\theta=25.7°$ of 59.3%.

EXAMPLE 36

A polpyrrole film having an electrical conductivity of 60.7 S/cm was obtained by performing the same reaction as in Example 34 except that tetraethyl ammonium p-toluenesulfonate was used as the electrolyte and acetonitrile, as the solvent. The film was stretched 50% at a rate of 50%/min., and heat-set at 150° C. for 5 minutes to form a film having an electrical conductivity of 113.8 S/cm.

In the X-ray diffraction pattern of this film, an orientation diffraction pattern was observed $2.\theta=24.1°-27.5°$ in a direction at right angles to the stretching direction. The stretched film had a degree of orientation at $2\theta=25.7°$ of 67.5%.

EXAMPLE 37

Example 34 was repeated escept that 1-methylpyrrole was used instead of pyrrole. The resulting film had an electrical conductivity of $1.3\times10^{-3}$ S/cm. When the film was stretched 30% at a rate of 0.5%/min., its electrical conductivity became $5.1\times10^{-3}$ S/cm. The stretched film had a degree of orientation at $2\theta=25.7°$ of 43.2%.

EXAMPLE 38

The film obtained in Example 34, (1) was rolled under a linear pressure of 400 kg/cm at 100° C. by two rolls having a diameter of 20 cm and surface-coated with Teflon.

The resulting film had an electrical conductivity of 129.3 S/cm and a degree of orientation at $2\theta=25.7°$ of 48.1%.

EXAMPLE 39

The film obtained in Example 34, (1) which had a thickness of 35 micrometers and an electrical conductivity of 85.6 S/cm was stretched 15%. The stretched film had an electrical conductivity of 97.6 S/cm and a degree of orientation of 41.8%.

EXAMPLE 40

An electrically conductive polypyrrole film was prepared in accordance with Example 1, (1) and (2), and then stretched 80%. The mechanical properties of the film before and after stretching are shown in Table 7 below.

TABLE 7

| Film | Strengh (kg/mm$^2$) | Modulus (kg/mm$^2$) |
|---|---|---|
| Unstretched | 4.0 | 60 |
| Stretched | 20.3 | 470 |

A marked improvement in the mechanical properties was obtained by stretching.

What we claim is:

1. An oriented electrically conductive polypyrrole article of doped polypyrrole having a degree of orientation of at least 40% in at least one direction wherein said polypyrrole is selected from the group consisting of a homopolymer of pyrrole, a homopolymer of a pyrrole derivative, copolymers of pyrrole and copolymers of said pyrrole derivatives, wherein said pyrrole derivatives are selected from the group consisting of N-C$_{1-5}$ alkyl derivatives, N-phenyl derivatives, substitution products of the N-phenyl derivatives, and derivatives obtained by substituting a C$_{1-5}$ alkyl or alkoxy group at the beta-position of the pyrrole ring.

2. The electrically conductive polypyrrole article of claim 1 wherein the dopant is a halogen anion, a peracid anion, a protonic acid anion, an anion from a Lewis acid, an anion from an organic carboxylic acid, or an anion from an organic sulfonic acid.

3. The electrically conductive polypyrrole article of claim 1 which is in the form of a film, a rod or a filament.

4. The electrically conductive polypyrrole article of claim 1 which has a degree of orientation of at least 70% in at least one direction.

5. The electrically conductive polypyrrole article of claim 1 which has a degree of orientation of at least 60% in at least one direction.

6. The electrically conductive polypyrrole article of claim 1 or 2 wherein the electrically conductive polypyrrole is electrochemically synthesized and simultaneously doped.

7. The electrically conductive polypyrrole article of claim 1 or 5 wherein the electrically conductive polypyrrole is obtained by exchanging the dopant of an electrochemically synthesized and simultaneously doped polypyrrole with another dopant.

8. An electrically conductive doped polypyrrole article having an electrical conductivity of at least 200 S/cm wherein said polypyrrole is selected from the group consisting of a homopolymer of pyrrole, a homopolymer of a pyrrole derivative, copolymers of pyrrole and copolymers of said pyrrole derivatives, wherein said pyrrole derivatives are selected from the group consisting of N-C$_{1-5}$ alkyl derivatives, N-phenyl derivatives, substitution products of the N-phenyl derivatives, and derivatives obtained by substituting a C$_{1-5}$ alkyl or alkoxy group at the beta-position of the pyrrole ring.

9. The electrically conductive doped polypyrrole article of claim 8 having an electrical conductivity of at least 300 S/cm.

10. The electrically conductive polypyrrole article of any one of claims 1, 5, 3 or 8 wherein the polypyrrole is a homopolymer of pyrrole.

* * * * *

UNITED STATES PATENT AND TRADEMARK OFFICE
CERTIFICATE OF CORRECTION

PATENT NO. : 4,585,695
DATED : April 29, 1986
INVENTOR(S) : MAKOTO OGASAWARA, ET AL.

It is certified that error appears in the above-identified patent and that said Letters Patent is hereby corrected as shown below:

IN THE CLAIMS

Claim 6, line 2, (column 12, line 44), delete "2", insert --5--.

Claim 10, line 2, (column 12, line 66), delete "3", insert --2--.

Signed and Sealed this

Fifth Day of August 1986

[SEAL]

Attest:

Attesting Officer

DONALD J. QUIGG

Commissioner of Patents and Trademarks